United States Patent [19]

Storm

[11] 4,048,925
[45] Sept. 20, 1977

[54] VEHICLE FOR AND METHOD OF OPERATION ON BOTH ROAD AND RAILROAD TRACK

[75] Inventor: Anders Georg Storm, Solna, Sweden

[73] Assignee: Swedish Rail System AB SRS, Solna, Sweden

[21] Appl. No.: 694,634

[22] Filed: June 10, 1976

[30] Foreign Application Priority Data

June 11, 1975 Sweden .............................. 7506711

[51] Int. Cl.² ............................................. B61F 13/00
[52] U.S. Cl. .................................. 105/215 C; 105/177
[58] Field of Search ................. 105/215 C, 177, 4 R, 105/4 A, 159; 104/32 R, 32 A

[56] References Cited

U.S. PATENT DOCUMENTS

| | | | |
|---|---|---|---|
| 2,154,140 | 4/1939 | Schmohl | 105/159 |
| 2,884,870 | 5/1959 | Day | 105/159 X |
| 3,263,628 | 8/1966 | Grove et al. | 105/215 C |
| 3,434,432 | 3/1969 | Seifert | 105/215 C |
| 3,610,169 | 10/1971 | Shannon | 105/215 C |
| 3,701,323 | 10/1972 | Cox | 105/215 C |
| 3,762,337 | 10/1973 | McKeon et al. | 105/215 C |
| 3,877,390 | 4/1975 | Wallace | 105/215 C |

FOREIGN PATENT DOCUMENTS

| | | | |
|---|---|---|---|
| 585,779 | 6/1923 | France | 105/215 C |
| 1,109,517 | 9/1955 | France | 105/215 C |
| 1,508,295 | 10/1969 | Germany | 105/177 |
| 455,894 | 3/1950 | Italy | 105/215 C |

*Primary Examiner*—Robert J. Spar
*Assistant Examiner*—Carl Rowold
*Attorney, Agent, or Firm*—Sughrue, Rothwell, Mion, Zinn and Macpeak

[57] ABSTRACT

A vehicle for operation on both road and railroad track is provided with a wheeled chassis comprising a steered front wheel axle and a rear wheel axle, both with road or rubber tire wheels. A front and a rear wheel axle are provided with rail wheels, the rear rail wheel axle being pivotable around a vertical axis relative to the wheel chassis. The rail wheel axles are vertically displaceable to be moved into engagement with the railroad track during the lifting of adjacent rubber tire wheels out of engagement with the ground. The rear rail wheel axle is located behind the rear wheel axle for road or rubber tire wheels of the vehicle and is turnable at least 180° around the vertical axis. Preferably two parallel rear rail wheel axles are mounted on a bogie, which is turnable or rotatory relative to the wheeled chassis. The bogie also incorporates a drive unit comprising a motor and a gear and is by means of a link system including a hydraulic cylinder-piston unit permanently secured to the rear part of the vehicle.

6 Claims, 6 Drawing Figures

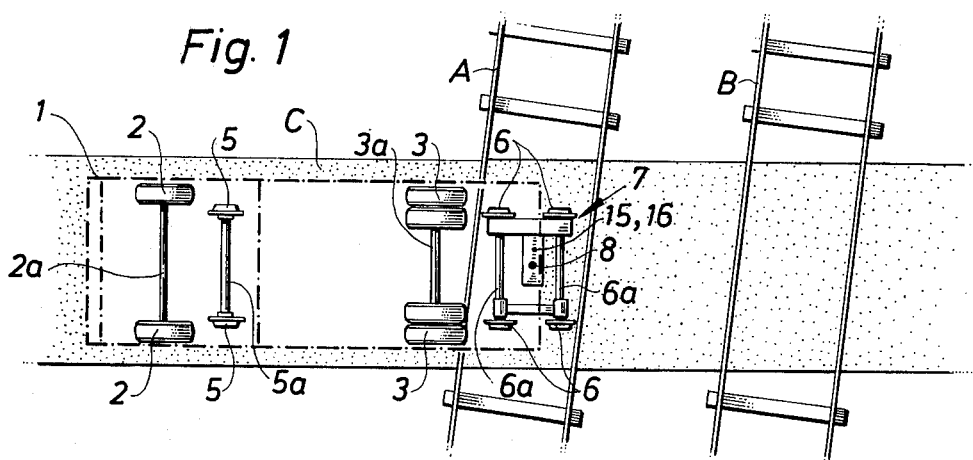
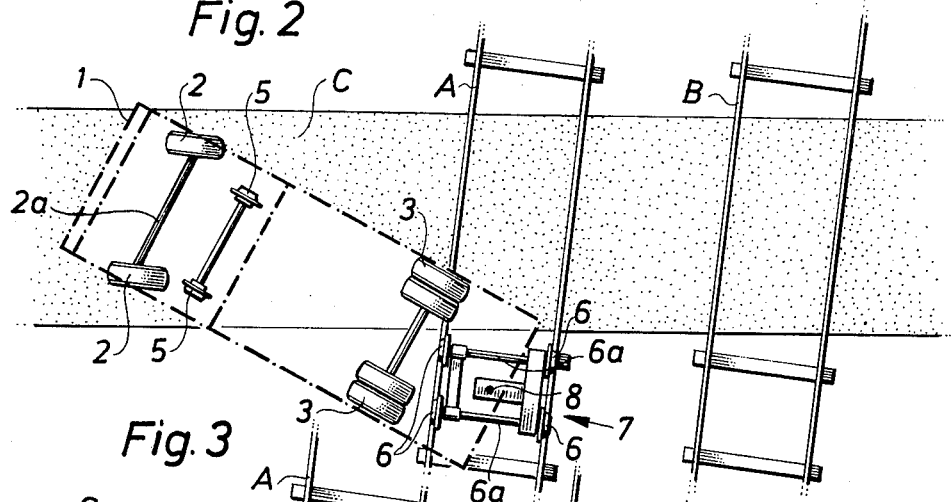
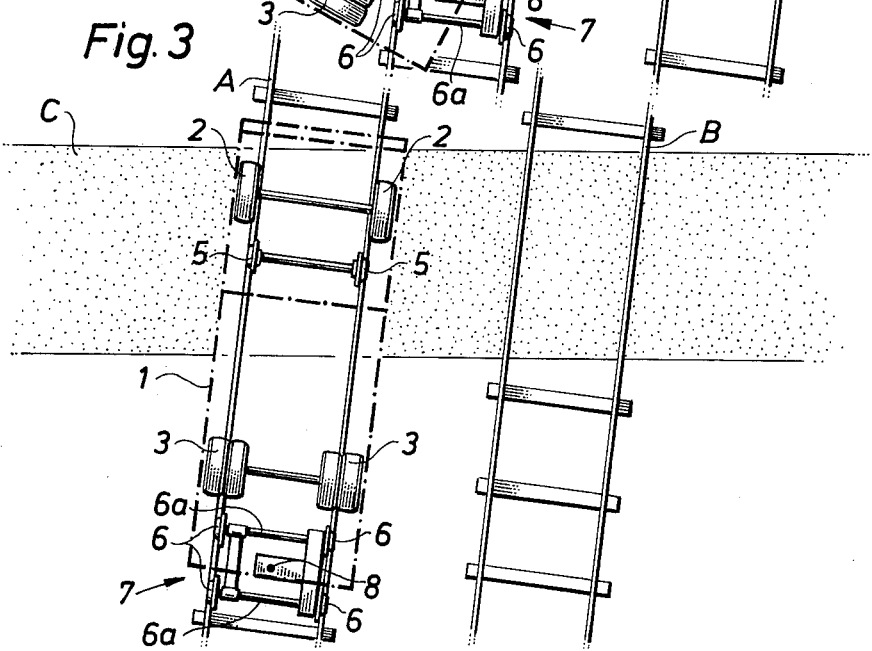

VEHICLE FOR AND METHOD OF OPERATION ON BOTH ROAD AND RAILROAD TRACK

This invention relates to a vehicle capable to operate on both road and railroad track.

Vehicles of this kind are previously known, which are transferred between road and railroad track means of a plate liftable and lowerable approximately beneath the gravity centre of the vehicle, which plate by support on the rails or on the ground or on the sleepers between the rails can lift the vehicle so as to permit its turning about a vertical axis.

In connection with its transfer, the vehicle positioned perpendicularly to the railroad track can encroach upon adjacent tracks and require traffic restrictions or constitute a collision risk on said tracks. In view of the relatively small size of the support plate, the requirements with respect to the position of the cargo on the vehicle are high and in practical operation render the handling of the cargo difficult and tedious.

At other conventional vehicles of said kind for instance according to U.S. Pat. Nos. 3,434,432 and 2,230,090 the transfer between road and track takes place in such a manner, that by operation on the road the vehicles can be moved into such a position that the railroad wheels can be lowered onto the rails. The vehicle requires at the place of transfer a roadway of great width, and yb mistake the vehicle can easily encroach upon adjacent rails with resulting risks and other inconveniencies as stated above.

The Swiss Pat. No. 295,285 describes another type of vehicle where the rear rubber wheels engage the tracks so as to drive the vehicle therealong. It is accordingly necessary that the distance between the rubber wheels corresponds with the track width.

The present invention has the object of producing a vehicle at which the aforesaid shortcomings are eliminated.

According to the invention there is accomplished a vehicle for operation on both road and railroad track, provided with a wheeled chassis comprising a steered front wheel axle and a rear wheel axle, both with road or rubber tire wheels, and a front and a rear wheel axle provided with rail wheels, the rear rail wheel axle being pivotable around a vertical axis relative to the wheel chassis, said rail wheel axles being vertically displaceable to be moved into engagement with the railroad track during the lifting of adjacent rubber tire wheels out of engagement with the support, wherein the rear rail wheel axle is located behind the rear wheel axle for road or rubber tire wheels of the vehicle and is turnable at least 180° around the vertical axis.

At a vehicle of this kind the turnable or rotatory rear rail wheel axle can be caused to operate simultaneously with the front steered wheel axle provided with rubber tire wheels for carrying the vehicle, so that, for example, the vehical can be turned while the wheels of the rear rail wheel axle all the time are in contact with the rail track and without encroachment upon the space of an adjacent track. A vehicle according to the invention, thus, provides a substantially increased saftey, and it can be utilized for carrying out its intended service work on a railway line with substantially reduced inconveniencies and at reduced costs, because the traffic on adjacent tracks must not be restricted.

The vehicle also contributes to an increase in saftey to that extent that at operation on rails the load of the vehicle rests to 100 per cent on the rail wheels. When the vehicle is on the rails, a safe indication is received in the signal box tower, which is not always the case when part of the vehicle load is relieved thereby that rubber tire wheels carry a part thereof. The unneglectible risk at arrangements of said lastmentioned kind that the vehicle may derail and, respectively, tilt also is substantially eliminated at a vehicle according to the invention.

It is preferred in practical operation that two parallel rear rail wheel axles are mounted on a bogie, which is supported turnable or rotatory relative to the wheeled chassis. As in the case of only one wheel axle, the vertical turning or rotation axis preferably extends through the centre line of the vehicle.

One or more wheels on the rear rail wheel axle or axles preferably are drive wheels, as this facilitates the operation of the vehicle, for example in connection with its turning around. The wheels preferably are driven hydraulically, but also other drive arrangements can be utilized.

An embodiment of the invention is described in greater detail in the following, with reference to the accompanying drawings in which FIGS. 1–3 show the lower part or wheeled chassis of a vehicle according to the invention in different positions at the transfer of the vehicle from a road to a railroad track.

Figure 4:
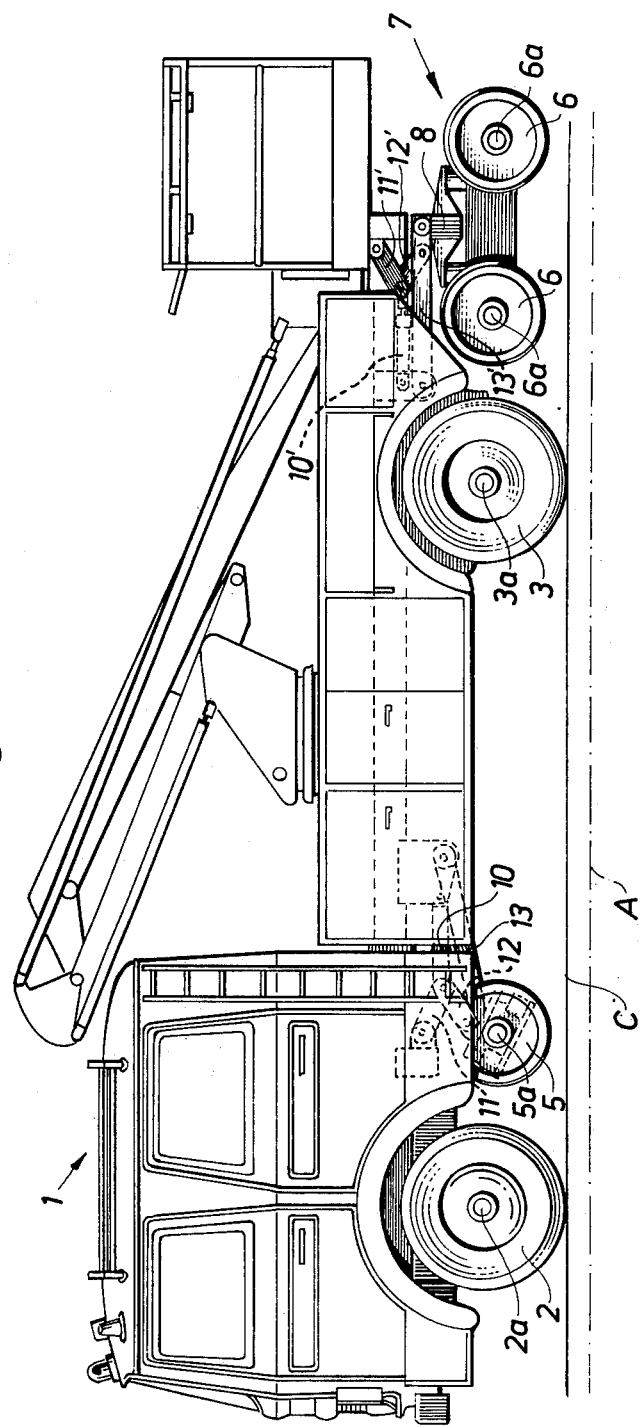
FIG. 4 is a side view of a vehicle according to the invention having a working platform.

At the position shown in FIG. 1, the vehicle chassis 1 rests on road or rubber tire wheels 2 on the front wheel axle 2a and on road or rubber tire wheels 3 on the rear axle 3a. The railroad wheels 5, 6 on the front and rear rail axle 5a and, respectively, 6a are lifted. A and B denote two adjacent rail tracks whereas C denotes a narrow way or road crossing said tracks.

FIGS. 1–3 show two rear rail wheel axles 6 which are mounted on a bogie 7. In FIG. 1 the bogie is shown in such a position that the wheel axles 6a extend approximately in parallel with the track. By turning the wheel axles and pressing the wheels 6 down against the rails, the road wheels 3 are lifted off the roadway C.

FIG. 2 shows the vehicle after the bogie 7 by turnign about its vertical axis 8 has been moved through a distance along the track. This can be effected, for example, thereby that the wheels of the bogie are operated by control from the driver's cabin of the vehicle. By turning the front wheels axle 2a during the movement of the bogie along the track, the front rubber tire wheels 2 can be caused to follow a substantially straight line. This implies that the road C must not have a width greated that necessary for operating the vehicle thereon.

In FIG. 3 the vehicle has been moved into a position above the track. The front railroad wheels 5 can now be pressed down against the rails, so that the road wheels 2 are lifted off the roadway. By means of the driven wheels 6 in the bogie 7, the vehicle can be operated in the described direction on the railroad track.

In the drawing also a track B is indicated in order to show how the movement of the vehicle guided by track A renders it possible to operate on the track B without restrictions during the transfer operation, if the bogie 7 in a suitable manner is located in the rearward end portion of the vehicle.

The invention also relates to a method of turning around a vehicle of the kind referred to when it is on a railroad track. At the turning around the rail wheels 6 of the turnable or rotatory rear wheel axle or axles 6a remain on the track while the forward portion of the vehicle supported on the road or rubber tire wheels 2 on the steered axle 2a is moved off the track into a position where the vehicle forms an angle of about 90° with the track. The vehicle then is operated with the rear rail wheel axle or axles 6a first until the vehicle has assumed a position in parallel with the track, in which position the vehicle is turned into the opposite direction relative to the starting position. The front rail wheel axle 5a then is pressed downward whereby the rail wheels 5 are moved into engagement with the track. The turning around operation then is completed, and the vehicle can operate as a rail vehicle in the direction opposed to the previous one. It is understood that the requirements on road space located to the side of the track and utilized during the turning around operation are very low. Possibly a road is not required at all, as the turning around operation can be carried out substantially at any place along the track, provided that the support is reasonably firm and not too uneven. The vehicle may possibly carry planks or the like to be laid out perpendicularly to the track when a turning around operation is to be carried out.

The novel and characterizing feature of the turning around operation described is, that during this operation the rear rail wheels and front road or rubber tire wheels operate simultaneously in co-operation with each other.

Figure 5:
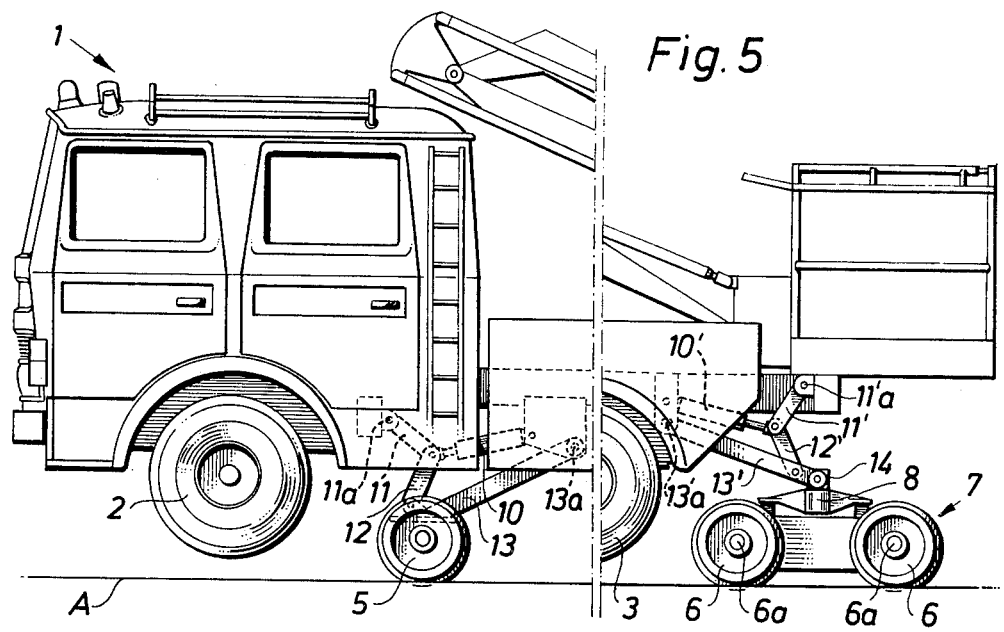
FIG. 5 is a side view of the front and rear part of the vehicle according to FIG. 4 to a greater scale.
Figure 6:
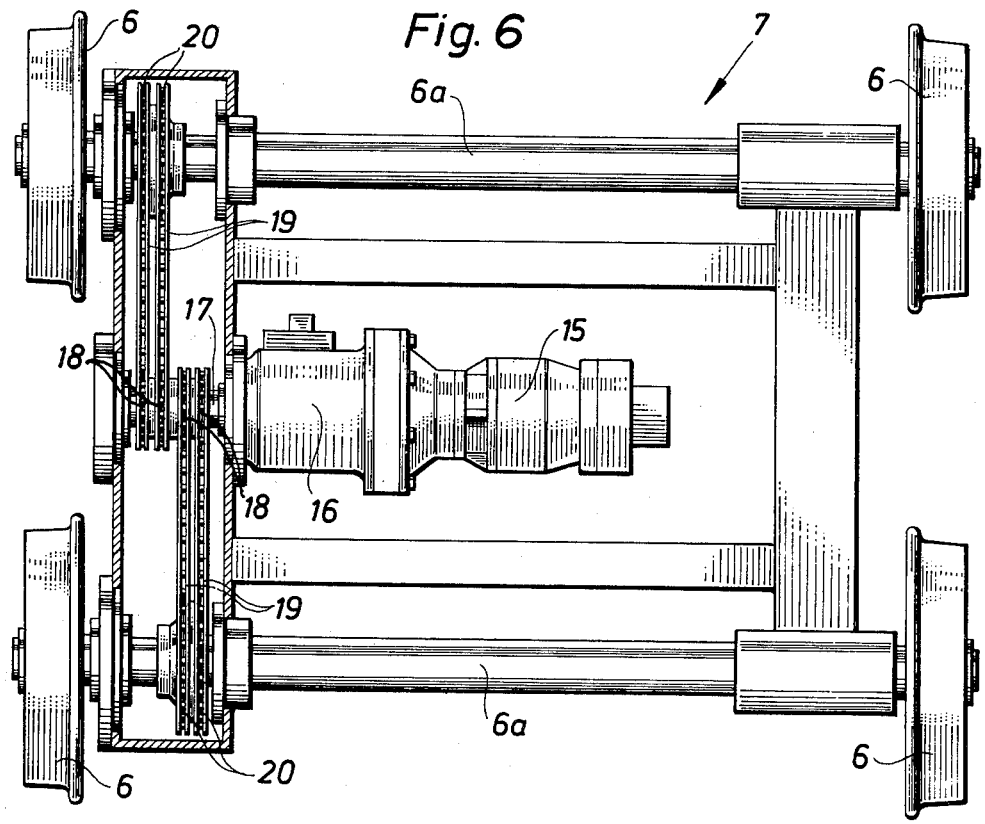
FIG. 6 is a plan view of the rear rail wheel chassis for the vehicle according to FIGS. 4 and 5.

FIGS. 4 and 5 illustrate a road vehicle of more or less standard design having a working platform. To the vehicle there is mounted a front rail wheel axle 5a which is vertically movable by means of a hydraulic cylinder-piston unit 10 engaging a link system 11, 12. To the system belongs an arm 13 pivoting around a point 13a.

A corresponding link system 11', 12', 13' actuated by a cylinder-piston unit 10' displaces a bogie 7 having two rail wheel axles 6a vertically. A hydraulic drive unit powers all four wheels 6. It comprised a motor 15, a gear box 16 and a chain gear 18, 19, 20 which drives the two axles 6a. The bogie 7 is rotatable around a vertical axle 8. It can in a simple way be mounted to the vehicle.

The principle of the invention is applicable also when the rear wheels have no drive means, and various other modifications of the invention can be imagined within the scope of its basic idea as it is defined in the attached claims. One or more of both road and rail wheels, for example, may be mounted on a separate wheel axle.

What is claim is:

1. A vehicle for operation on both road and railroad track, provided with a wheeled chassis which enables the vehicle to transfer between a road and a railroad track that are substantially perpendicular to each other comprising a steered front rubber tire wheel axle and a rear rubber tire wheel axle, and at least one front and rear rail wheel axle provided with rail wheels, each rear rail wheel axle pivoting around a vertical axis relative to the wheel chassis, said rail wheel axle being vertically displaced by drive means into engagement with the railroad track during the lifting of adjacent rubber tire wheels out of engagement with the road wherein the rear rail wheel axle is located behind the rear wheel axle for rubber tire wheels of the vehicle and pivots at least 180° around the vertical axis.

2. A vehicle according to claim 1, wherein two parallel rear rail wheel axles are mounted on a bogie, which pivots about a vertical axis relative to the wheeled chassis.

3. A vehicle according to claim 2, wherein one or more wheels on the rear rail wheel axle are drive wheels.

4. A vehicle according to claim 3, wherein the bogie incorporates a drive unit comprising a motor and a gear, and said bogie pivots about a vertical axis by means of a link system including a hydraulic cylinder-pistor unit being permanently secured to the rear part of the vehicle.

5. A method of turning around a vehicle having rail wheels on axles positioned behind a front steered and a rear road wheel axle carrying rubber tire wheels, respectively, on a railroad track, comprising the steps of at the turning around movement keeping the rail wheels for the rear wheel axle or axles which pivots about a vertical axis on the track while supporting the forward portion of the vehicle on the rubber tire wheels on the steered axle, moving off the road by having the rubber tire wheels at a position where the vehicle forms an angle of about 90° with the track, thereafter moving the vehicle with the rear rail wheel axle on the track to a position in parallel with the track, so that the vehicle is turned into the opposite direction relative to the starting position, and engaging the rail wheels on the front rail wheel axle with the track.

6. A method as claimed in claim 5 wherein the step of moving the vehicle when simultaneously supported by front rubber by front rubber tire wheels on the road and by rear track wheels on the track is achieved by driving the rear track wheels.

* * * * *